(12) United States Patent
Ballard

(10) Patent No.: US 8,282,078 B2
(45) Date of Patent: Oct. 9, 2012

(54) CABLE GUIDE WITH AUTOMATIC CABLE RELEASE

(76) Inventor: Jennifer K. Ballard, Roachdale, IN (US)

( * ) Notice: Subject to any disclaimer, the term of this patent is extended or adjusted under 35 U.S.C. 154(b) by 428 days.

(21) Appl. No.: 12/628,723

(22) Filed: Dec. 1, 2009

(65) Prior Publication Data

US 2011/0127475 A1   Jun. 2, 2011

(51) Int. Cl.
   *B65H 59/00*   (2006.01)
(52) U.S. Cl. .................................. 254/134.3 R
(58) Field of Classification Search ............ 254/13, 254/134.3 R, 134.3 FT, 93 R
   See application file for complete search history.

(56) References Cited

U.S. PATENT DOCUMENTS

| | | | |
|---|---|---|---|
| 1,117,211 A | 11/1914 | Mayes | |
| 2,483,760 A | 10/1949 | Duncan | |
| 2,783,025 A | 2/1957 | Scheidt | |
| 2,946,559 A | 7/1960 | Pickett | |
| 2,949,279 A | 8/1960 | Eitel | |
| 3,070,355 A | 12/1962 | Wyatt | |
| 3,072,383 A | 1/1963 | Vanderhagen | |
| 3,134,575 A | 5/1964 | Walter | |
| 3,300,191 A | 1/1967 | Leigh | |
| 3,863,897 A | 2/1975 | Yeager | |
| 3,908,962 A | 9/1975 | Ross | |
| 4,129,287 A | 12/1978 | Lindsey et al. | |
| 4,270,734 A | 6/1981 | Straight | |
| 4,475,715 A * | 10/1984 | Asplin, Sr. ............. | 254/134.3 R |
| 4,690,381 A | 9/1987 | Asai | |
| 4,844,419 A | 7/1989 | Danielsson | |
| 5,573,226 A | 11/1996 | Smith | |
| 6,315,269 B1 | 11/2001 | Fleury et al. | |
| 6,367,778 B1 | 4/2002 | Mobley et al. | |
| 6,540,207 B1 | 4/2003 | Barnes | |
| 6,729,606 B1 | 5/2004 | Durin | |
| 6,805,334 B2 | 10/2004 | Forsberg et al. | |
| 7,195,296 B2 * | 3/2007 | Swift et al. ................. | 294/68.24 |
| 7,216,850 B2 | 5/2007 | Kwon | |
| 8,052,098 B1 * | 11/2011 | Kowaleski ...................... | 248/49 |
| 2007/0101660 A1 * | 5/2007 | Koncelik ............................ | 52/1 |
| 2011/0127476 A1 * | 6/2011 | Ballard .................. | 254/134.3 R |

FOREIGN PATENT DOCUMENTS

| | | |
|---|---|---|
| GB | 1457941 | 12/1976 |
| WO | 96/36975 | 11/1996 |
| WO | 97/06905 | 2/1997 |
| WO | 00/11769 | 3/2000 |

* cited by examiner

*Primary Examiner* — Branon Painter
(74) *Attorney, Agent, or Firm* — Bruce J. Bowman

(57) ABSTRACT

A system, method and apparatus for guiding and installing cables in a building provides automatic and controlled release of cables that are temporarily retained by the cabling apparatuses to allow the once retained and now bundled cables to be permanently mounted in the building. The cabling apparatus has a frame supporting four elongated rollers so as to define a rectangular cable retention area bounded by the four elongated rollers. The cable retention area allows for the accumulation and retention of a number of cables fed through the cable retention area. A lower elongated roller of the four elongated rollers is pivotally connected to the frame such that pivoting of the lower elongated roller releases the accumulated cables. A remote controlled actuation system is connected to the pivoting lower elongated roller to provide automatic pivot control thereof. The system of a plurality of cabling apparatuses allows the stringing and temporary holding of one or more cables during a cabling installation and the simultaneous or individual release of the accumulated cables from the cabling apparatuses.

8 Claims, 7 Drawing Sheets

CABLE GUIDE WITH AUTOMATIC CABLE RELEASE

BACKGROUND OF THE INVENTION

1. Field of the Invention

The present invention relates generally to devices for guiding elongated items such as cables, wires, cords and the like and, more particularly, to devices for guiding and temporarily holding cables, wire and the like during a cabling or wiring installation.

2. Background Information

The process of installing cables, wires and/or other elongated items (collectively, 'cables') for audio, video and/or other applications such as television, the Internet, telephone, intercoms, fiber optic and the like, as well as power and other electricity-based applications (collectively, "applications") within a building (i.e. 'cabling') is a time consuming job. Particularly, cables must be physically strung throughout the building from one location to another location. Even for just one application, numerous cables must be run from one or more locations to one or more destinations. When multiple applications are being installed concurrently, there is a great increase in the number of cables, making the cable installation unwieldy as well as time consuming.

With the typical cabling process, individual cables are manually run from one building location to another building location and then temporarily hung or held until transferred to permanent cable holders or otherwise permanently mounted. In order to facilitate this process, various devices have been proposed to hold and/or help guide cables being installed. These devices are known as cable blocks, cable hangers, cable guides, pulley blocks or a combination of such terms (collectively, "cable blocks"). Such cable blocks allow a cable to be manually received therein, be guided thereby while the cable is being moved through the cable block, and then be manually removed from the cable block when desired. Some cable blocks, such as those shown and described in U.S. Pat. Nos. 6,315,269 issued to Fleury et al. on Nov. 13, 2001 and 6,540,207 issued to Barnes on Apr. 1, 2003, utilize a frame that supports a single roller for accepting and guiding a cable received therein. Each frame is configured to hang on an overhead wire or the like and includes a spring or spring-loaded mechanism to allow insertion and removal of a cable therein. These types of cable blocks are generally acceptable for use in straight or linear installations of cable, but are deficient for non-linear cable installations (i.e. around corners, bends and the like). Moreover, it is necessary with these cable guides to manually remove the cable or cables from their single roller cable block frame. Thus, it is necessary to physically go to each cable block in order to manually remove the cable from the cable block. Therefore, these types of cable blocks do not save cable installation time nor do they ease the cable installation process.

As another design and/or in order to overcome some of the limitations of single roller and other similar cable blocks such as those described above, some cable blocks have four rollers that define a rectangular opening bounded by the four rollers. For instance, U.S. Pat. Nos. 2,483,760 issued to Duncan on Oct. 4, 1949 ("Duncan"), 3,070,355 issued to Wyatt on Dec. 25, 1962 ("Wyatt"), and 6,729,606 issued to Durin on May 4, 2004 ("Durin") each disclose a four roller cable guide. However, Duncan, Wyatt and Durin, as well as other similar four roller cable guides, are not designed for easy removal (if removal at all) of cables from the cable guide. With these types of cable guides, the cables must be manually removed longitudinally from the cable guide (i.e. by a free end of the cable).

In order to alleviate the shortcomings of such multi-roller cable guides and/or to provide a cable guide that allows easy access to its interior several styles of multi-roller cable guides have been devised. For instance, in U.S. Pat. No. 2,949,279 issued to Eitel on Aug. 16, 1960 ("Eitel"), a four-roller configuration cable guide has a top roller that pivots relative to the other three rollers. Thus, the top roller swings out of the way for placing a cable therein and removing a cable therefrom in order to provide a top-loading cable guide. In U.S. Pat. No. 2,946,559 issued to Pickett on Jul. 26, 1960 ("Pickett"), another four-roller, top-loading cable guide is provided. However, with Pickett, the top and two side rollers are all pivotally connected to a base that holds the bottom roller. Thus, the three-roller assemblage swings out of the way for placing a cable therein and removing a cable therefrom, thereby providing another top-loading (and top un-loading) cable guide. In U.S. Pat. No. 5,573,226 issued to Smith on Nov. 12, 1996 ("Smith"), another multi-roller cable guide is provided. In Smith, two angled frame members each support two rollers. The two angled frame members are pivotally connected to each other to provide a releasable opening that allows access to the interior of the cable guide. Again, as with the other cable guides, the Smith cable guide is configured for manual placement and removal of cable into the interior of the cable guide.

It is thus apparent from the above discussion that prior art cable guides do not promote the efficient overhead installation of cable within a building. It is also apparent from the above discussion that prior art cable guides lack features that allow for efficient overhead cable installation within a building. Particularly, it is apparent from the above discussion that prior art cable guides lack automation that allows for efficient overhead cable installation within a building.

In view of the above, it is thus desirable to provide a cable guide that allows for the efficient overhead installation of cable within a building. It is further desirable to provide a cable guide that utilizes automation to aid in the cable installation process. It is moreover desirable to provide a process for the overhead installation of cable within a building that utilizes automated cable guides.

SUMMARY OF THE INVENTION

The present invention is a cabling device, system and method for guiding and temporarily holding cables during overhead installation thereof within a building, wherein the cabling device provides automatic and controlled release of cable(s) temporarily held by the cabling device.

The cabling device is characterized by a frame defining an interior configured to hold one or more cables. The frame has a pivoting portion whose pivoting defines open and closed positions wherein the closed position holds cables within the interior of the frame, while the open position releases cables held within the interior of the frame. The pivoting portion is coupled to an actuation system that allows controlled and automatic pivoting of the pivoting portion and thus the retention and release of cables from and by the cabling device. The actuation system is preferably, but not necessarily, remote controlled such that the position of the pivoting portion, and thus the retention and release of cables from the cabling device, is controlled remotely and accomplished automatically. Additionally, the pivoting portion preferably, but not necessarily, pivots downwardly relative to the frame such that the open position thereof allows gravity to release the cable(s) retained in the frame.

In one form thereof, the cabling device has a frame supporting four elongated rollers so as to define an interior, rectangular cable retention area bounded by the four elongated rollers. The cable retention area allows for the accumulation and retention of a number of cables fed through the cable retention area. A lower elongated roller of the four elongated rollers is pivotally connected to the frame such that pivoting of the lower elongated roller releases the accumulated cables.

In one form, the actuation system is characterized by a piston that is connected to the pivoting portion of the frame of the cabling device such that the piston controls movement of the pivoting portion. The piston is operatively connected to an electric motor that drives the piston. The electric motor is operatively connected to and driven by a controller and battery. The controller is operable and/or configured to control the motor to control the piston to control the pivoting portion to control the mode of operation of the cabling device, and to receive, either wirelessly or via hardwiring, process and implement remotely-generated control signals.

In one form, the cabling device includes a manner of attaching, hanging or suspending itself to or from a structure or the like in or of a building. A contractor (e.g. a clamp, vise, pincer or the like) is attached to a rod, pole, shaft or the like that extends from the frame. The rod is preferably, but not necessarily, length adjustable. The contractor is configured to allow attachment to a variety of structures and thus may take many forms.

In the system and method of the present invention, cabling devices are situated along an indoor cabling route by attaching the cabling devices to overhead structures within the building. With the cabling devices in a closed position or mode, cable may be strung through the frames of the cabling devices (i.e. along the cabling route) whereby the cables are temporarily held by, or retained or accumulated in the cabling devices. Receipt of an appropriate command signal from a remote signal transmitter/generator by the cabling device controllers operates the respective actuation system to actuate the respective piston to pivot the respective pivoting portion of the respective cabling device into the open position. Thus, any cables held during a cabling installation procedure are either simultaneously or individually automatically released, dropped or dumped from the cabling devices.

BRIEF DESCRIPTION OF THE DRAWINGS

The above mentioned and other features, advantages and objects of this invention, and the manner of attaining them, will become apparent and the invention itself will be better understood by reference to the following description of embodiments of the invention taken in conjunction with the accompanying drawings, wherein.

Like reference numerals indicate the same or similar parts throughout the several figures.

Figure 1:
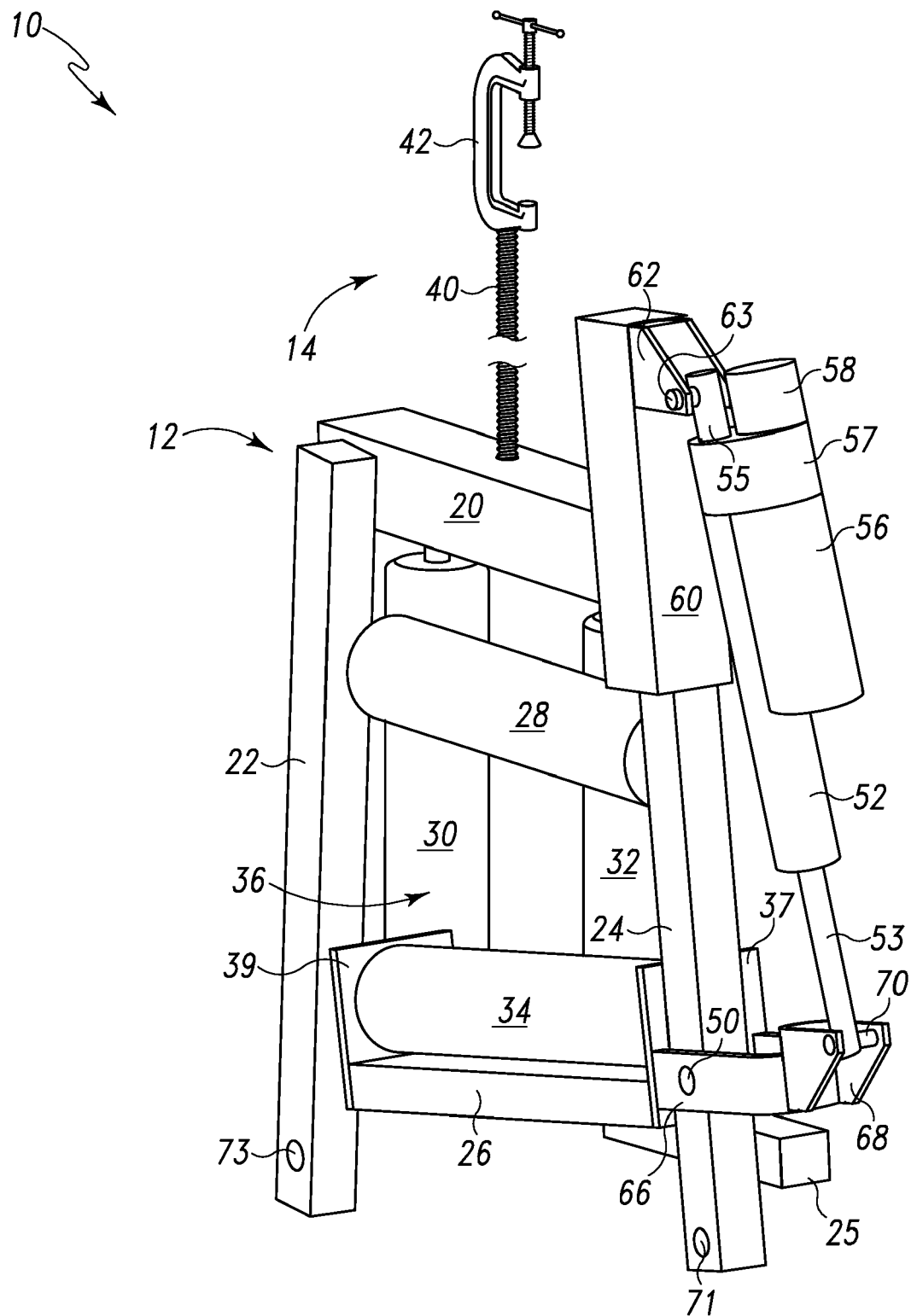
FIG. 1 is a perspective view of an exemplary embodiment of a cabling device with automatic cable release fashioned in accordance with the present principles, the cabling device shown in a fully closed (cable retention) position.

A description of the features, functions and/or configuration of the components depicted in the various figures will now be presented. It should be appreciated that not all of the features of the components of the figures are necessarily described. Some of these non discussed features as well as discussed features are inherent from the figures. Other non discussed features may be inherent in component geometry, configuration and/or function.

DETAILED DESCRIPTION OF EMBODIMENTS OF THE INVENTION

In FIGS. 1-4, there is shown various views of a cabling/cable apparatus or device, generally designated 10, configured in accordance with the present principles for receiving, guiding and/or temporarily holding or retaining elongate items such as, but not limited to, cables, wires, hoses, and conduit (collectively, cables) during overhead installation of same within a building (i.e. during a cable or cabling installation or procedure). As described further below with reference to FIGS. 5 and 6, the cabling device 10 is configured to be temporarily attached or connected to an overhead structure in a building and to receive a free end of a cable therethrough for temporarily holding up (supporting) the cable(s) (see FIG. 5) before the cable or cables are automatically released from the cabling devices 10 (see FIG. 6) and then transferred to a permanent cable holder (not shown). It should be appreciated that for a typical cable or cabling installation and again, as described further below, a plurality of cabling devices 10 are used.

The cabling device 10 is characterized by a frame 12 formed of a plurality of frame sections, portions, segments, members or the like (collectively, sections) that are fabricated from a suitably strong and preferably lightweight material such as aluminum which can hold the weight of a plurality of cables. It should be appreciated that metals such as steel or a metal alloy, and other materials such as plastics, composites or the like may also be used for the frame/frame sections. It should also be appreciated that the configuration of the frame may be modified accordingly.

The frame 12 includes an upper or top frame section 20, a first lateral or side frame section 22 and a second lateral or side frame section 24. The first lateral frame section 22 is attached to and extends from a side of the upper frame section 20, while the second lateral frame section 24 is attached to and extends from another side of the upper frame section 20. The frame 12 also includes a lower or bottom frame section 26 that is pivotally attached to the second lateral frame section 24. It should be appreciated that the nomenclature first and second is arbitrary. Moreover, the nomenclature upper, lower, top and bottom are also arbitrary, but do define the general orientation of the frame sections when the cabling device 10 is hung. It should also be appreciated that while the frame 12 defines a generally rectangular shape, the frame may take other shapes that are consistent with the principles and/or functionality of the present invention.

The frame 12 is a rigid support. The first lateral frame section 22 is rigidly connected to the top frame section 20, while the second lateral frame section 24 is likewise rigidly connected to the top frame section 20. In particular, the first lateral frame section 22 is attached at an upper end thereof to a first end of the upper frame section 20, while the second lateral frame section 24 is attached at an upper end thereof to a second end of the upper frame section 20. In accordance with an aspect of the present invention, the lower frame section 26 is pivotally coupled to the second lateral frame section 24 such that the lower frame section 26 pivots or swings relative to the second lateral frame section 24. A connection yoke member 66 is coupled at one end thereof to a first lateral roller support 37 associated with the proximal end of the lower frame section 26 and pivotally connected at pivot 50 to a lower end of the second lateral frame section 24. In this manner, pivoting of the connection member 66 pivots the first lateral roller support 37 and thus the lower frame section 26 such that the distal end of the lower frame section 26 (i.e. the end of the lower frame section 26 that is distal pivot 50) can pivot, swing, move or translate downwardly away from the first lateral frame section 22. As explained further below with reference to FIG. 4, the pivoting of the lower frame section 26 also pivots a lower roller 34 that is associated with the lower frame section 26 such that the area 36, bounded on the lower side by the lower frame section 26 (and the lower roller 34), is open. This causes cables that have been retained by the cabling apparatus 10 (i.e. within the area 36) to be released from the cabling device 10 through gravity.

The frame 12 carries, holds and/or supports four rollers 28, 30, 32, 34 embodied herein as axially elongated rollers that together define an enclosure or area 36 (a cable retention area) that is thus bounded by the rollers 28, 30, 32, 34. It should be appreciated that the style and dimensions of the rollers 28, 30, 32, 34 may be different than those shown. The roller 28 is situated between and retained by the first and second lateral frame sections 22 and 24 such that its longitudinal axis and/or axis of rotation is generally, but not necessarily, coaxial with or parallel to the longitudinal axis of the upper frame section 20. The roller 28 thus defines an upper roller and boundary to the cable retention area 36. The upper roller 28 thus extends along the inside length of the upper frame section 20.

The roller 30 is situated between the upper frame section 20 and a roller support 23 that is connected to and extends transversely from the first lateral frame section 22. The roller 30 is situated such that its axis and/or axis of rotation extends generally, but not necessarily, normal or perpendicular to the upper roller 28. The roller 30 thus defines a first lateral roller and boundary to the cable retention area 36. The first lateral roller 30 thus extends generally along the inside length of the first lateral frame section 22.

The roller 32 is situated between the upper frame section 20 and a roller support 25 that is connected to and extends transversely from the second lateral frame section 24. The roller 32 is situated such that its axis and/or axis of rotation extends generally, but not necessarily, normal or perpendicular to the upper roller 28. The roller 32 thus defines a second lateral roller and boundary to the cable retention area 36. The second lateral roller 32 thus extends generally along the inside length of the second lateral frame section 24.

The roller 34 is carried by the lower frame section 26 such that its longitudinal axis and/or axis of rotation is generally, but not necessarily, coaxial with or parallel to the longitudinal axis of the lower frame section 26 and which essentially extends between the first and second lateral frame sections 22 and 24. Particularly, the lower frame section 26 supports a first transverse roller support 37 at one end of the lower frame section 26, and a second transverse roller support 39 at the other end of the lower frame section 26, with the roller 34 supported by and between the first and second transverse roller supports 37, 39 such that the roller 34 is essentially parallel to or coaxial with the lower frame section 26. The roller 34 thus defines a lower roller and boundary to the cable retention area 36. The lower roller 34 thus extends along the inside length of the lower frame section 26.

The upper and lower rollers 28, 34 are thus disposed opposite to and generally, but not necessarily, parallel to one another while the first and second side rollers 30, 32 are thus disposed opposite to and generally, but not necessarily, parallel to one another. The rollers 28, 30, 32 and 34 form a bounded reception area, interior or opening 36 through and into which the free end of a cable is received and which serve as cable guides as a cable is passed or pulled through the interior 36. The rollers 28 and 34 thus provide upper and lower guides while rollers 30 and 32 provide left and right side guides. As a cable is pulled through the opening 36, the rollers 28, 30, 32 and 34 roll or rotate when the cable makes contact with the respective roller, particularly when the cable being pulled through the apparatus 10 angles or bends in that specific direction.

Figure 2:
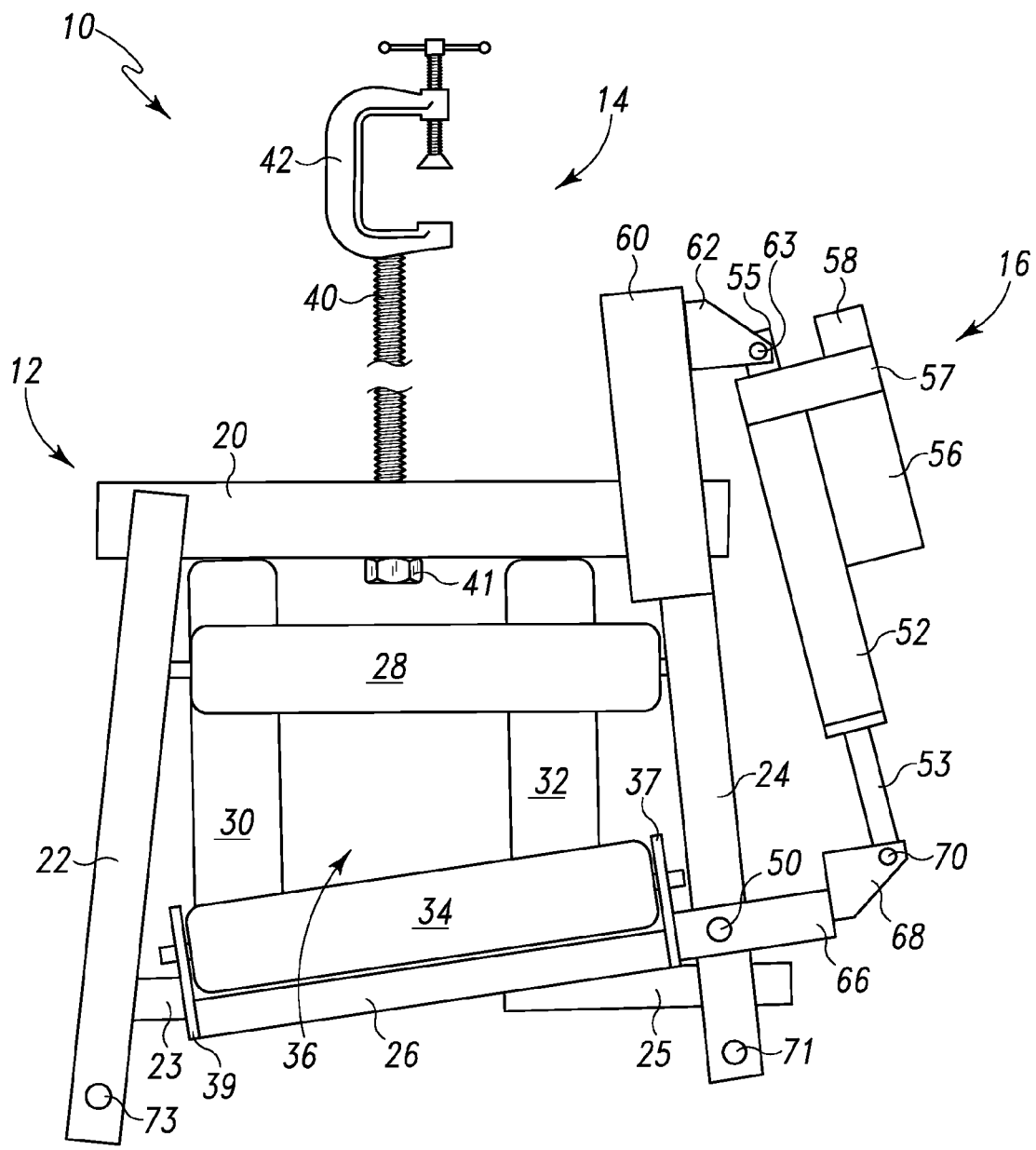
FIG. 2 is a front view of the cabling device with automatic cable release of FIG. 1.
Figure 3:
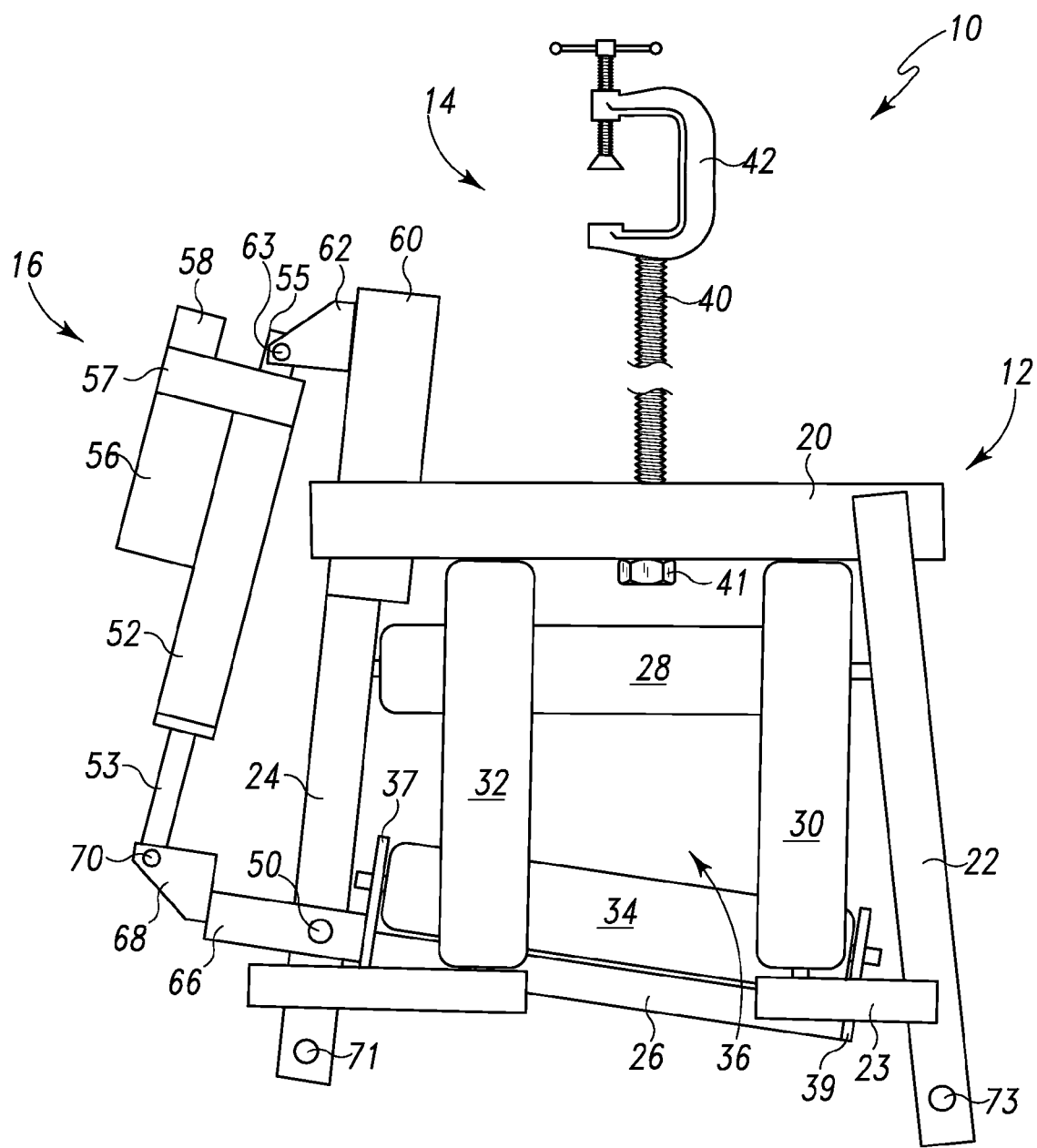
FIG. 3 is a rear view of the cabling device with automatic cable release of FIG. 1.
Figure 4:
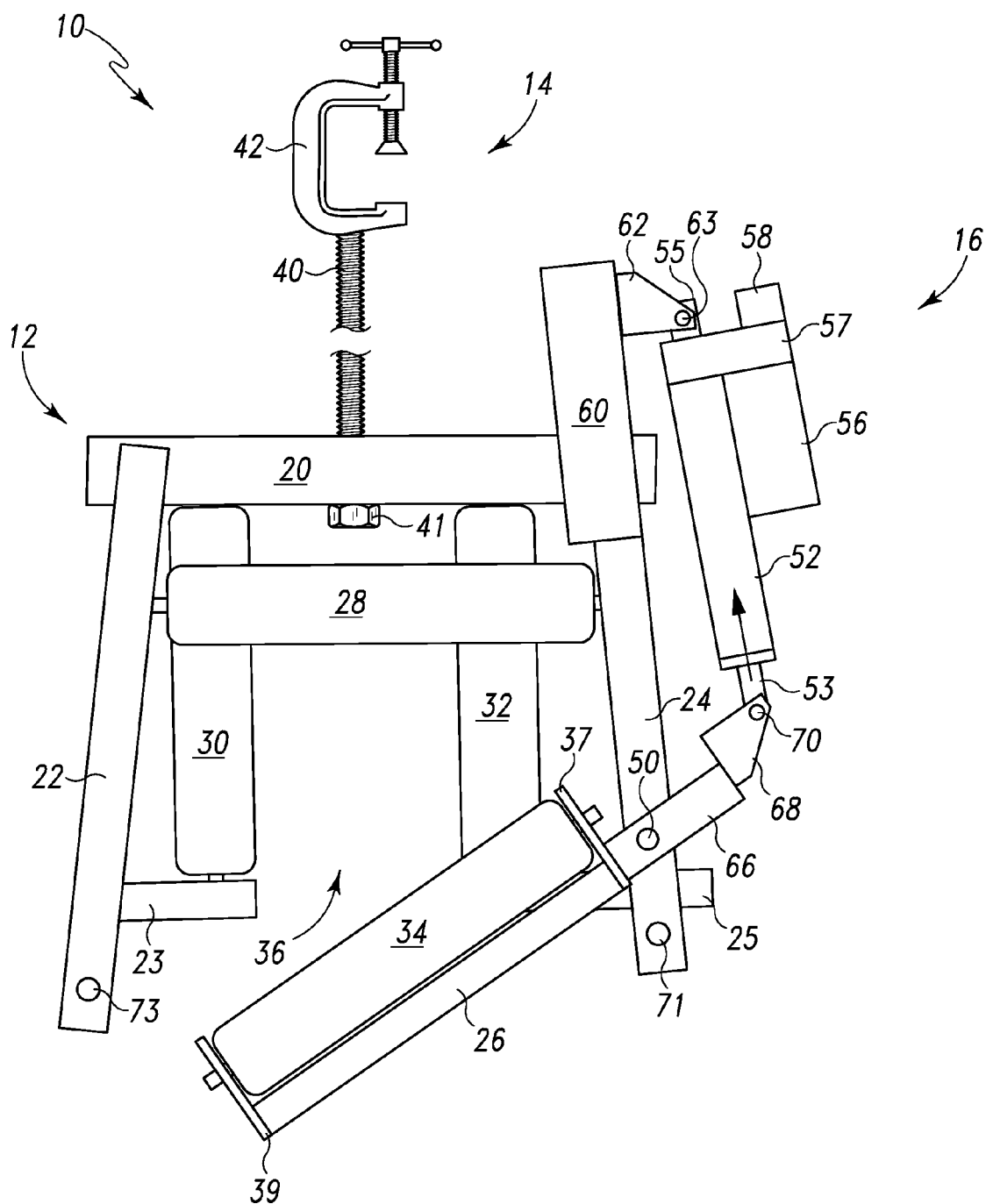
FIG. 4 is a front view of the cabling device with automatic cable release of FIG. 1 shown in a fully open (cable release) position.

As indicated above, the lower frame section 26 is pivotally coupled to the second lateral frame section 24 such that the lower frame section 26 pivots or swings relative to the second lateral frame section 24. Since lower roller 34 is connected to the lower section 26, the lower roller 34 may be considered a pivoting member. As such, the lower roller 34 may be considered as able to be in a fully closed (closed) mode, position or state such as depicted in FIGS. 1-3 and in a fully open (open) mode, position or state such as depicted in FIG. 4. It should be appreciated that pivoting of the roller 34 (and the lower frame section 26) between the fully closed position as depicted in FIGS. 1-3 and the fully open position as depicted in FIG. 4 causes the roller 34/lower frame section 26 to define various degrees of open/closed modes, positions or states. When the lower roller 34 is in the closed position, cables are retained in the interior 36 (by the cabling device 10) and when the lower roller 34 is in the open position, cables are released from the interior 36 (by the cabling device 10). Thus, in the open position (see FIG. 4) any cables accumulated within the interior 36 and resting on the lower roller 34 slide off of the lower roller 34 due to gravity and are released from the interior 36 of the cabling device 10.

The cabling device 10 is configured to be hung, suspended or otherwise attached to a structure, construction, formation, assembly or the like for the overhead installation of cable within a building. As such, the cabling device 10 has an attachment structure 14 connected to the frame 12 for temporarily connecting or attaching the cabling device 10 to an overhead structure, fixture, support, construction or formation or the like of a building (see, e.g., structure S of FIGS. 5 and 6). The attachment structure 14 is characterized by a rod, pole, shaft or the like 40 that extends from the frame member 20. A clamp or other adjustable fixation device 42 is disposed on the end of the rod 40 and is configured to temporarily fix, connect or attach the cabling apparatus 10 to the desired attachment structure. The fixation device 42 need not be adjustable. Additionally, the fixation device 42 may take other forms as appropriate for providing connection to the particular structure.

The attachment structure 14 is preferably, but not necessarily, adjustable in length to allow the cabling device 10/frame 12 to be adjustably mounted relative to the particular mounting structure. As such, the rod 40 is a threaded rod that extends through a bore (not seen) in the upper frame section 20. A nut 41 is threadedly received on the end of the threaded rod 40 that extends through the upper frame section 20. The nut 42 provides adjustment in length of the threaded rod 40 (and thus the clamp 42) by threading the rod 40 up and down on and relative to the nut 41. Thus, it should be appreciated that the rod 40 is shown in the figures in a fully extended position.

Pivoting of the lower frame section 26 and lower roller 34, and thus the retention and release of cables from the cabling device 10, is controlled by an actuator or actuating mechanism 16. The actuator 16 is characterized by a piston 52, a motor 56, motor gearing or transmission 57 and a controller 58. The piston 52 is operable to move the lower frame section 26/lower roller 34 to control the opening and closing of the frame 12/interior 36. The piston 52 is thus attached to the frame 12 and to the lower frame section 26 so as to control movement of the lower frame section 26. The upper part of the piston 52 is connected to the frame 12 while a piston shaft 53 of the piston 52 (at the lower end of the piston opposite the upper part 55) is connected to the lower frame section 26.

Particularly, an upper flange 55 of the piston 52 is pivotally connected via a pivot pin 63 to an upper connector 62, with the upper connector 62 mounted to an upper section 60 of the second lateral frame section 24, while the lower end of the piston shaft 53 is pivotally connected via a pivot pin 70 to a lower connector 68, with the lower connector 68 connected to one end of the connector yoke 66. The connector yoke 66 is connected to the first transverse roller support 37 of the lower frame section 26/lower roller 34. The connector yoke 66 is pivotally attached at 50 to the second lateral frame section 24 such that up/down movement of the connector yoke 66 by the piston shaft 53 (piston 52) causes up/down movement of the lower frame section 26/lower roller 34 to provide the open, closed and intermediate states, modes or positions of the cabling device 10. The pivotally-connected upper flange 55 thus allows the top of the piston 52 to pivot as necessary during movement of the piston shaft 53. Thus, when the piston shaft 53 is in an extended position such as shown in FIGS. 1-3, the frame 12 is closed since the end of the connecting yoke 66 proximate the piston shaft 53 has pivoted downwardly, causing the opposite side of the connection yoke 66 that is connected to the lower frame section 26/lower roller 34 to pivot upwardly. Therefore, when the piston shaft 53 is in a contracted position as depicted in FIG. 4 (the piston shaft movement thereof has been represented by the arrow), the frame 12 is open since the end of the connecting yoke 66 proximate the piston shaft 53 has pivoted upwardly, causing the opposite side of the connection yoke 66 that is connected to the lower frame section 26/lower roller 34 to pivot downwardly.

Figure 7:
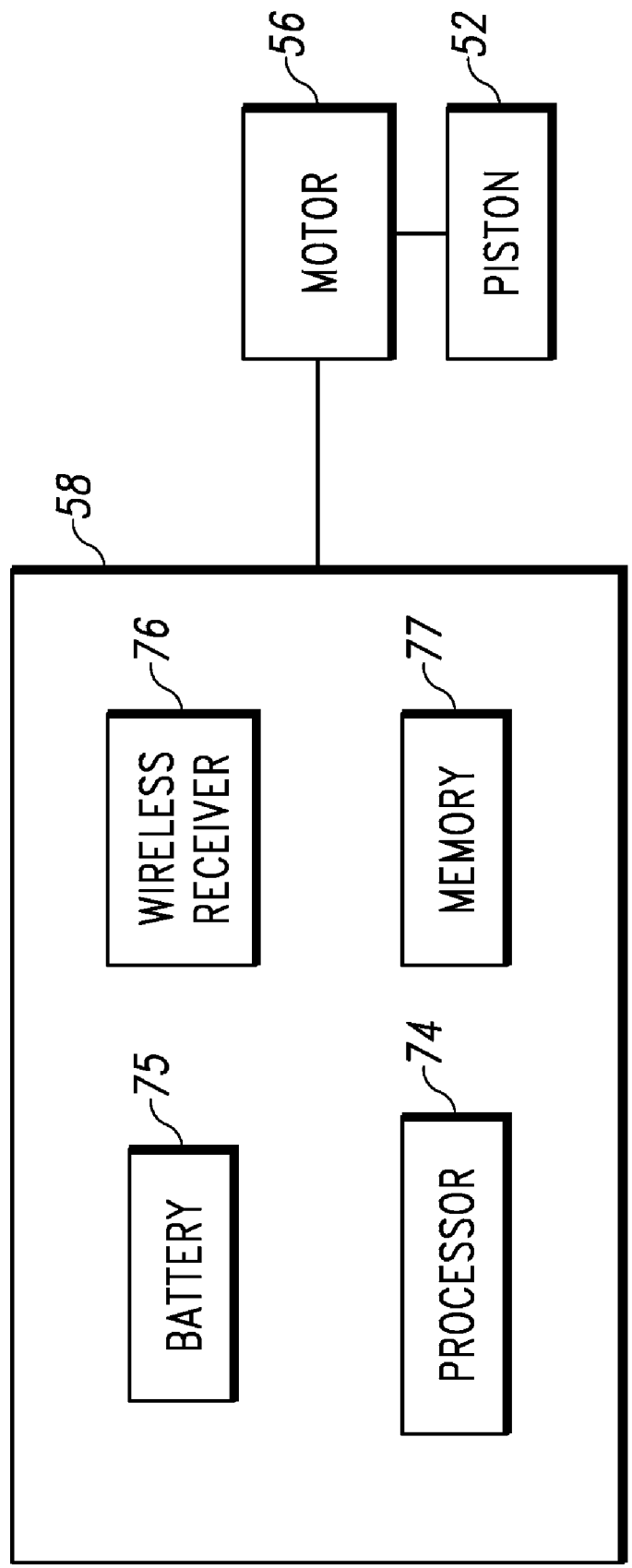
FIG. 7 is a block diagram of an exemplary actuation system of the present cabling device.

The piston 52 is operated preferably, but not necessarily, through gearing or the like 57 by a motor 56 that is preferably, but not necessarily, electric. The electric motor 56 is connected to and under the control of a controller 58. The controller 58 is operable to provide control signals to the motor 58 to control movement of the piston 52/piston shaft 53 to control movement of the lower frame section 26/lower roller 34 for opening and closing of the interior 36 of the cabling device 10 in order to retain or release cables from the interior 36. With additional reference to FIG. 7, there is depicted a block diagram of the controller 58 showing various components thereof and its relationship, in block diagram form, to the motor 56 and piston 52. The controller 58 includes a processor 74 or the like that provides overall processing and/or control of the various components of the controller 58. Memory 77 may be provided if desired in order to provide program and/or date storage for the controller. A wireless receiver 76 is provided that is operable to receive wireless signal(s) from a remote, cable guide control transmitter (not shown). The wireless signal(s) provide instructions to the controller 58/processor 74 for the opening and closing of the lower frame section 25/lower roller 34. The wireless receiver 76 includes the necessary antenna and processing to receive encoded or non-encoded wireless signals. Moreover, the wireless receiver 76/processor 74 may allow for each cable guide 10 to be separately addressable or have a unique identification number associated therewith in order to allow actuation of particular cable guides 10. Thus, if desired all of the cable guides 10 may be actuated at one time, or one or more cable guides 10 may be actuated separately or in groups of cable guides 10. A battery, batteries or other power source (collectively, battery) 75 is provided to power the controller 58. Preferably, but not necessarily, the battery 75 is rechargeable.

It should be appreciated that the controller 58 may have more or less components than those shown in order to operate in a typical manner and/or in the manner described herein. It should also be appreciated that the controller 58 may take other forms as appropriate. Moreover, if desired, each cable guide 10 may be hardwire-controlled and not wireless.

Figure 5:
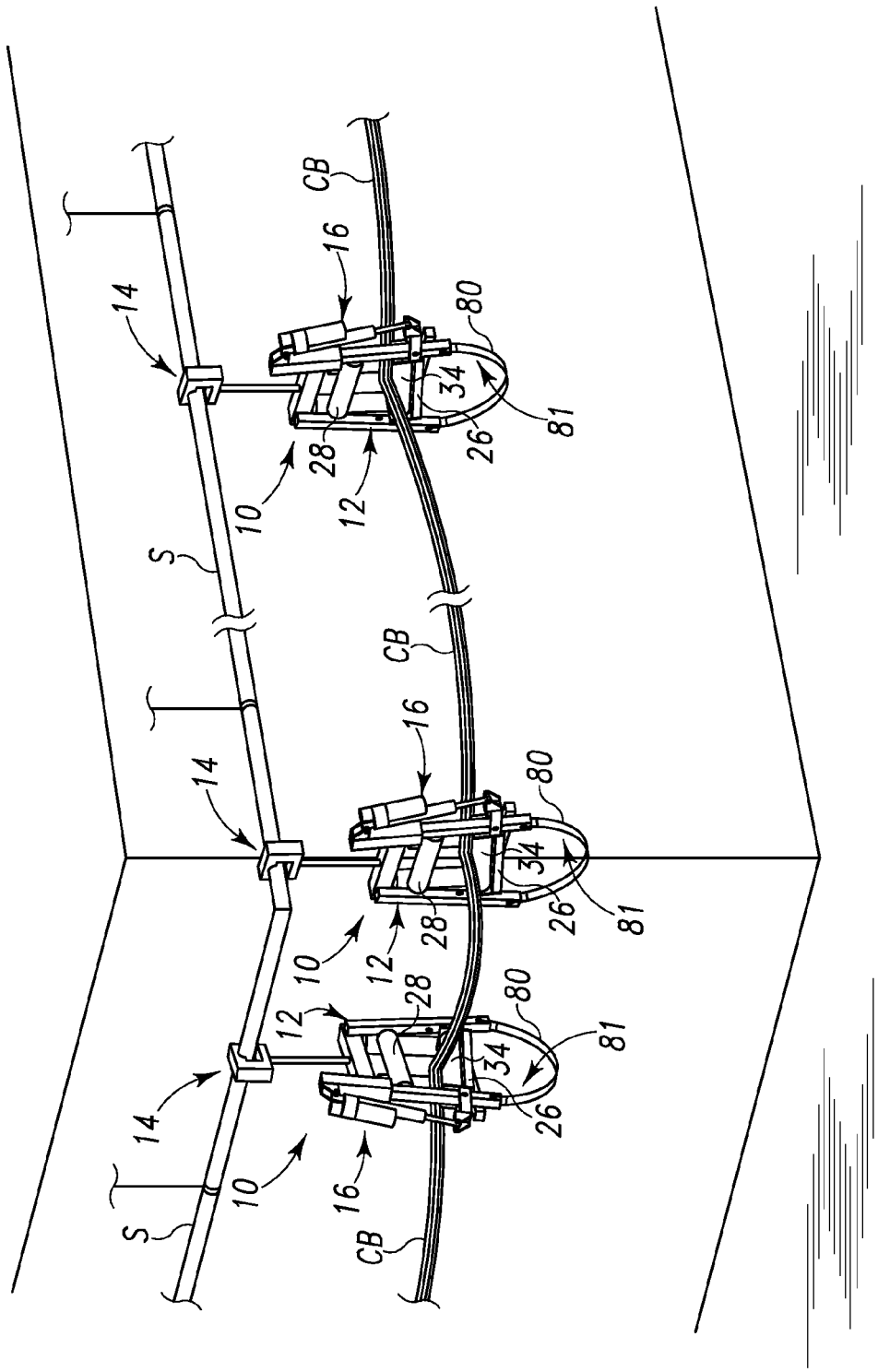
FIG. 5 is a perspective view of a portion of a cable installation (cabling) system (shown in exaggerated size) that utilizes a plurality of the cabling devices of FIG. 1, the cabling devices shown attached to an existing pipe (i.e. an overhead structure) within a building and in a cable retention mode or position.
Figure 6:
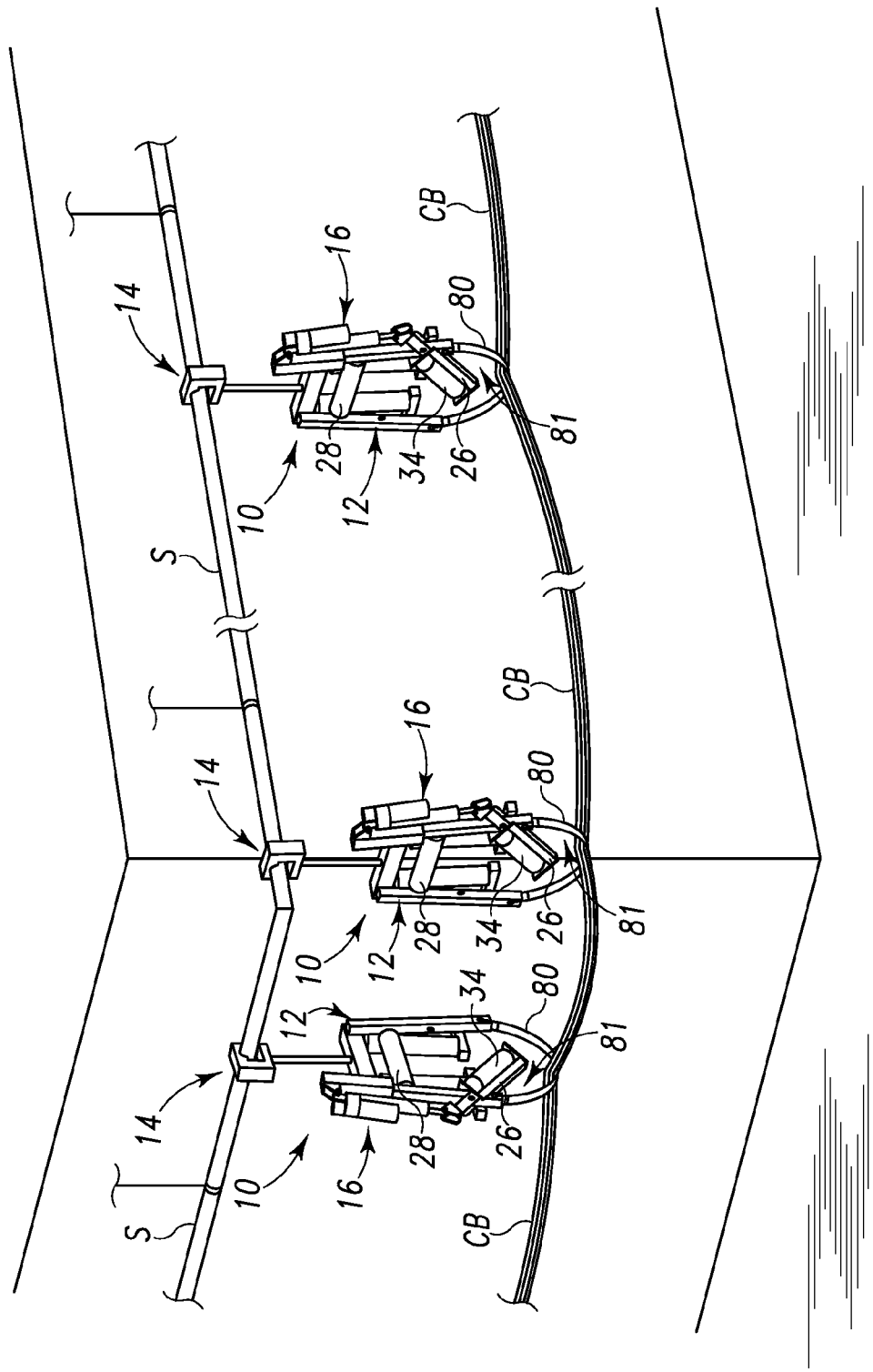
FIG. 6 is the perspective view of a portion of the cable installation (cabling) system as depicted in FIG. 5 but with the cabling devices shown in a cable release mode or position.

Referring now to FIGS. 5 and 6, there is depicted a mock example of a manner of using the present cable guides 10 to install overhead cabling in a building. A portion of a building, and particularly an angled hallway of a building, is shown having an overhead structure S. The overhead structure S may be a pipe, beam or other fixture or the like. A plurality of cable guides 10 are attached to the overhead structure S as appropriate. FIG. 5 depicts a first portion of the cabling operation wherein the cable guides 10 have been installed, are in a closed position whereby cables may be retained in the frame 12, and a plurality of cables (i.e. cable bundle CB) have been received and retained in the frame 12. The cables CB thus rest upon the lower rollers 34 of the lower frame sections 26 of the cable guides 10. The plurality of cable guides 10 are shown each having a strap 80 connected to the lower end of the frame 12. The strap or similar element 80 is connected to the frame 12 such that at least one end thereof is easily released from engagement with the frame 12. As described below, the straps 80 catch the cable bundle CB when the cable guides 10 are set to the open position. This is depicted in FIG. 6. In FIG. 6, the cable guides 10 have each received and acted upon a wireless signal to open the lower frame section 26 such that the cable bundle CB had slid off of the respective lower roller 34 (i.e. is released from the interior 36) and has been received in the respective interior 81 of the respective strap 80. The cable bundle CB may now be lifted into or onto a permanent cable retention structure (not shown).

While the invention has been illustrated and described in detail in the drawings and foregoing description, the same is to be considered as illustrative and not restrictive in character, it being understood that only a preferred embodiment has been shown and described and that all changes and modifications that come within the spirit of the invention are desired to be protected.

What is claimed is:
1. A cabling device comprising:
  a rigid frame having an upper frame member, a first lateral frame member extending from a first side of the upper frame member, a second lateral frame member extending from a second side of the upper frame section opposite the first side of the upper frame member, a first lower frame member extending from the first lateral frame, and a second lower frame member extending from the second lateral frame member, the first and second lower frame members extending towards each other, whereby the upper frame member, the first and second lateral frame members, and the first and second lower frame members define a mostly bounded interior;

a plurality of rollers supported within the mostly bounded interior of the rigid frame, the plurality of rollers defined by an upper roller supported by and between the first and second lateral frame members adjacent the upper frame member, a first lateral roller supported by and between the upper frame member and the first lower frame member, a second lateral roller supported by and between the upper frame member and the second lower frame member, and a lower roller pivotally connected to the first lateral frame member and extending between the first and second lower frame members, the lower roller pivotable so as to define a closed position wherein the mostly bounded interior is closed, and an open position wherein the mostly bounded interior is open; and an actuation system connected to the pivotally connected lower roller and operable to automatically control pivoting of the pivotally connected lower roller.

2. The cabling device of claim 1, wherein the actuation system is operable to automatically control pivoting of the pivotally connected lower roller through receipt of a wireless control signal generated by a remote wireless signal generator.

3. The cabling device of claim 1, wherein the actuation system comprises:
   a piston operatively connected to the pivotally connected lower roller;
   a motor operatively connected to the piston;
   a controller operatively connected to the motor; and
   a battery operatively connected to the controller and the motor.

4. The cabling device of claim 3, wherein the actuation system further comprises a wireless signal receiver operatively connected to the controller.

5. The cabling device of claim 1, wherein the pivotally connected lower roller is connected to an end of the first lateral frame section proximate the first lower frame section.

6. The cabling device of claim 1, further comprising a mount operable to allow attachment of the rigid frame to an overhead structure.

7. The cabling device of claim 6, wherein the mount is adjustable in length.

8. A method of installing overhead cable in a building comprising:
   providing a plurality of cabling guides, the cable guides having a rigid frame defining a mostly bounded interior, and a plurality of rollers supported by the rigid frame, one of the plurality of rollers connected to an arm pivotally attached to the rigid frame so as to define a closed position wherein the mostly bounded interior is closed, and an open position wherein the mostly bounded interior is open, an actuation system connected to the pivotally connected arm and operable to automatically control pivoting of the pivotally connected arm upon receipt of an actuation signal, and a mount operable to allow attachment of the rigid frame to an overhead structure;
   attaching the plurality of cable guides along the overhead structure;
   stringing cable through the mostly bounded interior of plurality of cable guides while the cable guides are in a closed position; and
   providing an actuation signal to the plurality of cable guides to put the cable guides in the open position, whereby cables retained by the plurality of cable guides are released from the partially bounded interiors of the cable guides.

\* \* \* \* \*